(12) United States Patent
Paquet

(10) Patent No.: US 7,568,870 B2
(45) Date of Patent: Aug. 4, 2009

(54) PUSH NUT

(75) Inventor: Jerome Paquet, Grenoble (FR)

(73) Assignee: A. Raymond Et CIE, Grenoble (FR)

( * ) Notice: Subject to any disclaimer, the term of this patent is extended or adjusted under 35 U.S.C. 154(b) by 0 days.

(21) Appl. No.: 12/092,330

(22) PCT Filed: Dec. 22, 2006

(86) PCT No.: PCT/EP2006/012443

§ 371 (c)(1),
(2), (4) Date: May 1, 2008

(87) PCT Pub. No.: WO2007/087884

PCT Pub. Date: Aug. 9, 2007

(65) Prior Publication Data

US 2008/0286066 A1    Nov. 20, 2008

(30) Foreign Application Priority Data

Jan. 13, 2006    (DE) .................. 10 2006 001 741

(51) Int. Cl.
F16B 37/04    (2006.01)

(52) U.S. Cl. .................. 411/177; 411/970; 411/125; 411/173

(58) Field of Classification Search .......... 411/182, 411/125, 172–175, 177, 527, 970
See application file for complete search history.

(56) References Cited

U.S. PATENT DOCUMENTS

| | | | | |
|---|---|---|---|---|
| 2,720,135 | A | * | 10/1955 | Gisondi ................. 411/61 |
| 3,426,817 | A | * | 2/1969 | Parkin ................. 411/173 |
| 4,606,688 | A | * | 8/1986 | Moran et al. ........... 411/175 |
| 4,610,588 | A | | 9/1986 | Van Buren, Jr. et al. |
| 4,925,351 | A | * | 5/1990 | Fisher ................. 411/182 |
| 6,095,734 | A | | 8/2000 | Postadan et al. |
| 6,908,274 | B1 | * | 6/2005 | Vassiliou ............... 411/437 |
| 7,226,260 | B2 | * | 6/2007 | Jackson et al. ......... 411/173 |

FOREIGN PATENT DOCUMENTS

| | | |
|---|---|---|
| DE | 3524651 A1 | 2/1986 |
| DE | 20319556 U1 | 3/2004 |
| DE | 60026487 T2 | 11/2006 |

OTHER PUBLICATIONS

International Search Report issued in PCT/EP2006/012443.

* cited by examiner

Primary Examiner—Gary Estermsky
(74) Attorney, Agent, or Firm—Baker & Daniels LLP

(57) ABSTRACT

A push nut comprises legs (6, 7), each of which is configured with outer struts (5), inner struts (17) spacedly disposed between the outer struts (5), and a tongue (19) lying between the inner struts (17) and projecting into an inner space (16) and intended to bear against a shank of a bolt that can be screwed into a thread portion (4). A high pull-out strength is thereby obtained with relatively low material expenditure.

5 Claims, 2 Drawing Sheets

PUSH NUT

RELATED APPLICATION

This application is a U.S. National Phase patent application based on International Application Serial No. PCT/EP2006/012443 filed Dec. 22, 2006, the disclosure of which is hereby explicitly incorporated by reference herein.

BACKGROUND OF THE INVENTION

1. Field of the Invention

The present invention is directed to a push nut.

2. Description of the Related Art

One known push nut is disclosed in DE 35 24 651 A1. The prior push nut, which is adapted for insertion into a recess in a support part and is made from a stamped and bent metal sheet, is provided with a cover plate, to which are joined two legs disposed opposite each other and extending in a direction away from the cover plate. Each leg is configured with an inner leg, which is joined to the cover plate, and with an outer leg, which is formed onto the end of the inner leg directed away from the cover plate and extends back in the direction of said cover plate. There is an inner space between the inner legs. Tongues are formed onto the ends of the outer legs facing toward the cover plate and project into the inner space. The cover plate is connected to a nut part comprising a thread portion, such that a shank of a bolt that can be brought into engagement with said nut part projects into the inner space and is borne against by the end faces of the free ends of the tongues, thus blocking any movement of the outer legs in the direction of the inner legs. This push nut does have a high pull-out strength, but its design is such that it requires relatively high material expenditure.

SUMMARY OF THE INVENTION

The present invention provides a push nut that yields a relatively high pull-out strength with relatively low material expenditure.

By virtue of the fact that in the inventive push nut, which is made from a stamped and bent metal sheet, the legs are each configured with outer struts and inner struts disposed inside one another and with a tongue that inwardly blocks the movement of the particular leg, the material expenditure is kept very low despite a relatively high pull-out strength, since the legs can each be made from just one relatively small-area strip of a section of sheet metal.

In one form thereof, the present invention provides a push nut for insertion in a recess in a support part, including a cover plate to which are joined two legs disposed opposite each other and extending in a direction away from the cover plate and which is connected to a nut part having a thread portion, there being configured between the legs an inner space which is provided to receive the shank of a bolt able to be brought into engagement with said nut part and into which tongues configured on the legs project, characterized in that each leg includes two outwardly disposed outer struts, each of which is joined by one end to the cover plate and by its other end to a foot portion belonging to the particular leg and located at the opposite end thereof from the cover plate, in that disposed between the outer struts of a leg are two inner struts, which are joined by one end to the foot portion and which extend away from the foot portions in the direction of the cover plate and stand connected to an end portion, the inner struts projecting laterally outwardly beyond the outer struts, in that formed on each end portion is one end of one of the tongues that project into the inner space, and in that the tongues, in the region where they are formed on, extend from the particular end portion away from the cover plate in the direction of the particular foot portion of the leg.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
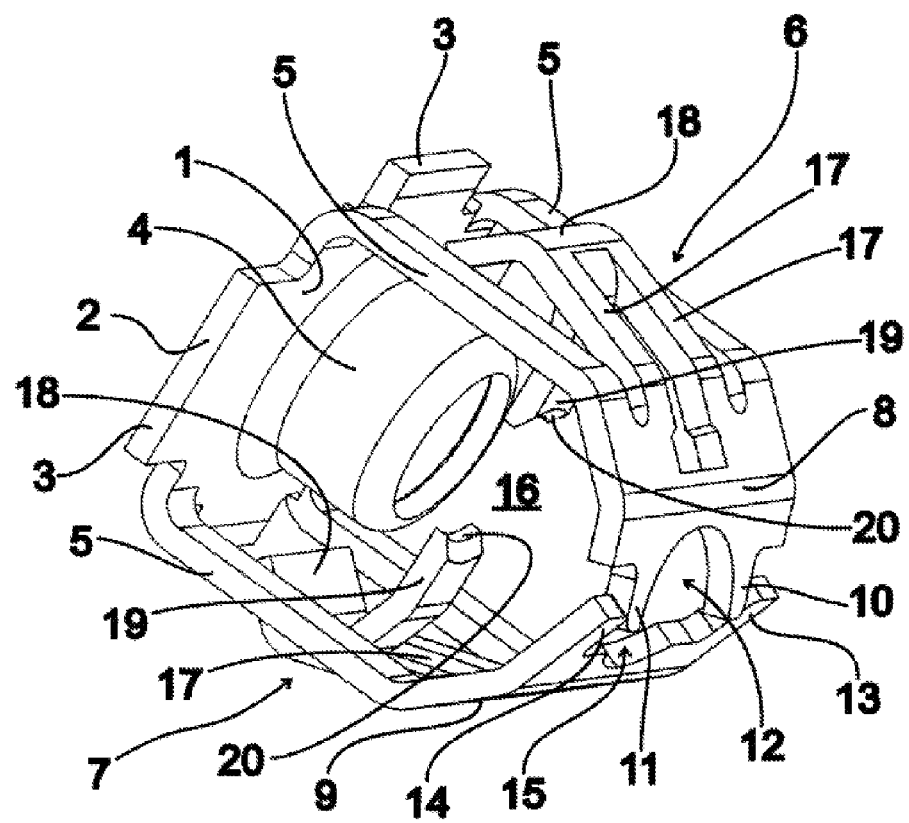
FIG. 1 is a perspective view of an exemplary embodiment of a push nut according to the invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION

FIG. 1 is a perspective view of an exemplary embodiment of a push nut according to the invention, which is made from a stamped and bent metal sheet and is provided for insertion in a recess in a support part (not shown in FIG. 1). The push nut according to FIG. 1 comprises a cover plate 1 having a substantially rectanguloid shape, on each of the edge faces of which are configured long edge tongues 2 and short edge tongues 3, disposed opposite each other in pairs. The edge tongues 2, 3 extend outwardly beyond and serve to enlarge the bearing surface of the cover plate 1 around the recess in the support part. A threaded bushing 4, as a nut part, is formed on at the center of the cover plate 1 and has as a thread portion an internal thread portion.

In modifications of the push nut according to the invention, the nut part is configured with stamped sheet-metal lobes that are made to stand up, and which serve as the thread portion.

Joined by one end to the cover plate 1 on both sides of each short edge tongue 3 are two outer struts 5 of a first leg 6 or second leg 7, respectively, which extend in a direction away from the cover plate 1. Each outer strut 5 is joined by its end directed away from the cover plate 1 to a flat foot portion 8, 9 respectively of a leg 6, 7 respectively, said foot portions 8, 9 being set at an angle and extending toward each other. One foot portion 8 is configured with inwardly disposed inner tongues 10, 11, which laterally surround a small foot recess 12, while the other foot portion 9 is provided with outer tongues 13, 14, which are disposed outward of inner tongues 10, 11 and laterally surround a large foot recess 15, with said inner tongues 10, 11 projecting into large foot recess 15. The push nut according to the invention is thus configured relatively compactly at its ends.

Thus, between legs 6, 7 there is an inner space 16 that is open sideward between legs 6, 7 and endward in the direction of cover plate 1 and foot portions 8, 9.

Joined by one end to each foot portion 8, 9 are two inner struts 17 that lie between the outer struts 5, are arranged spaced apart from each other and extend from the particular foot portion 8, 9 in the direction of the cover plate 1. Said inner struts 17 extend laterally outwardly away from the outer struts 5, such that with increasing distance from the foot portions 8, 9 they are spaced farther away from the outer side of outer struts 5, i.e., the side facing away from inner space 16.

The opposite end of each inner strut 17 from the respective foot portion 8, 9 is joined to an end portion 18 of a respective leg 6, 7. The plate-like end portions 18 extend, angled with respect to inner struts 17, in the direction of cover plate 1 and inner space 16, and pass between the laterally adjacent outer struts 5. In this way, the push nut according to the invention is also compactly configured in the region of the outer sides of legs 6, 7, and can be handled as bulk goods without excessive risk of the parts getting caught on one another.

Formed on each end portion 18 is a tongue 19, which tongues, in the region where they are formed on, extend away from the cover plate 1 and are angled by their free ends toward each other in the direction of inner space 16, such that they are oriented substantially at right angles to the outer struts 5, to help give the push nut a high pull-out strength. The end of each tongue 19 facing away from the respective end portion 18 is configured with a dished end face 20, which in the relaxed arrangement of the push nut depicted in FIG. 1 lies in prolongation of the outer wall of the threaded bushing 4, such that a bolt screwed into threaded bushing 4 can pass substantially unhindered between the tongues 17.

Figure 2:
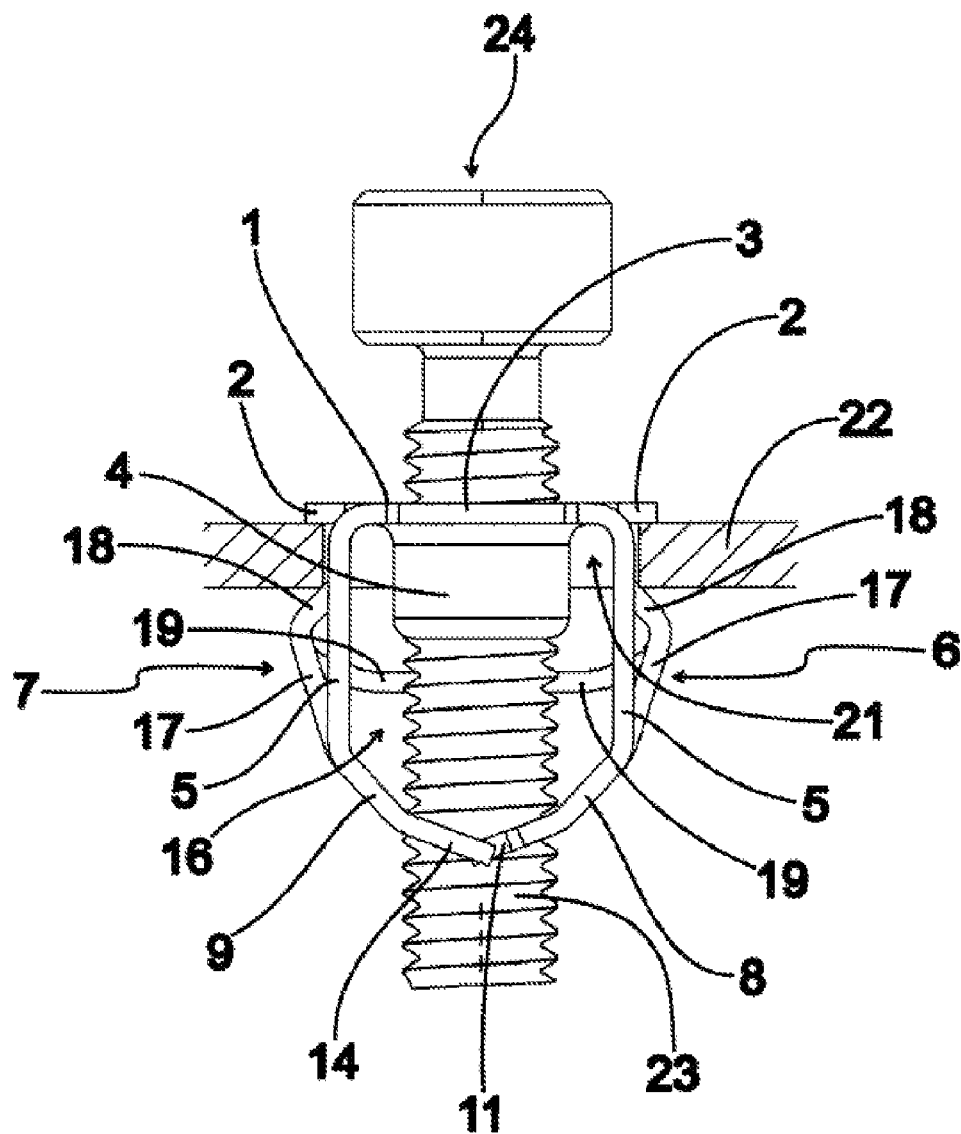
FIG. 2 is a longitudinal section of the exemplary embodiment according to FIG. 1 in an inserted arrangement in a recess in a support part.

FIG. 2 is a longitudinal section of the exemplary embodiment according to FIG. 1 in an inserted arrangement in a recess 21 in a support part 22, wherein a shank 23 of a bolt 24 provided to fasten an add-on part (not shown in FIG. 2) to the support part 22 is screwed into the threaded bushing 4 far enough so that it protrudes past the foot portions 8, 9 by way of the end of the push nut facing away from the cover plate 1. It can be seen from FIG. 2 that in this arrangement, the end faces 20 of the tongues 19 bear against the shank 23 of the bolt 24. By this means, any deflection of the end portions 18 bearing against the support part 22 on the side facing away from the cover plate 1 is blocked, and the pull-out strength of the push nut according to the invention is particularly high.

It should further be noted that the proper arrangement of the inventive push nut in the recess 21 is signaled by a clearly perceptible clicking sound as soon as the inner struts 17, which are initially pressed in between the outer struts 5, pass through the recess 21 and spring back out, producing the click.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A push nut insertable into a recess in a support part for use in receiving a bolt having a shank, said push nut comprising:
    a cover plate;
    a pair of legs extending from said cover plate and defining an inner space therebetween;
    a nut part connected to said cover plate and having a threaded portion for receiving the shank of the bolt with the shank disposed within said inner space;
    each leg further comprising:
        a pair of outer struts joined at first ends thereof to said cover plate and joined at opposite, second ends thereof by a foot portion;
        a pair of inner struts disposed between said outer struts, said inner struts joined at first ends thereof to said foot portion and joined at opposite, second ends thereof to an end portion, said inner struts extending away from said foot portion in a direction of said cover plate and projecting laterally outwardly beyond said outer struts; and
        a tongue formed on said end portion of said inner struts and projecting into said inner space, said tongues of said legs facing one another.

2. The push nut of claim 1, wherein said tongues include free ends oriented at right angles to said outer struts.

3. The push nut of claim 2, wherein said free ends of said tongues each include an end face with an inwardly curved recess.

4. The push nut of claim 1, wherein said end portions of said inner struts are disposed at an angle with respect to said inner struts and extend toward one other in a direction of said cover plate, said end portions disposed between and laterally adjacent their respective pairs of outer struts.

5. The push nut of claim 1, wherein one said foot portion includes a pair of inner tongues and another said foot portion includes a pair of outer tongues, said inner and outer tongues extending toward one another with said inner tongues disposed within said outer tongues.

\* \* \* \* \*